Jan. 23, 1951     I. T. MINYARD     2,539,354
PARAFFIN SCRAPER
Filed Aug. 12, 1946
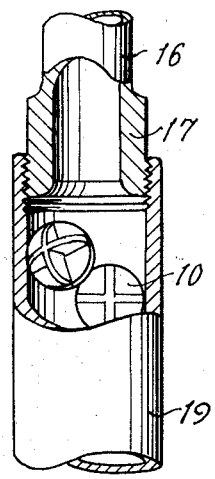
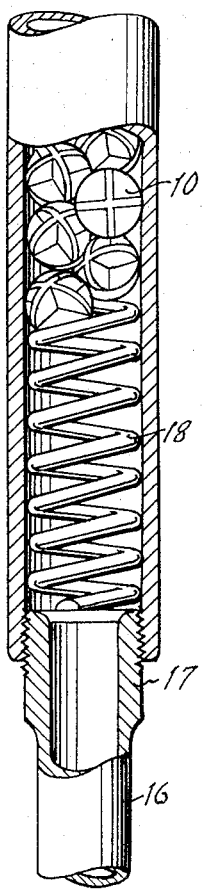
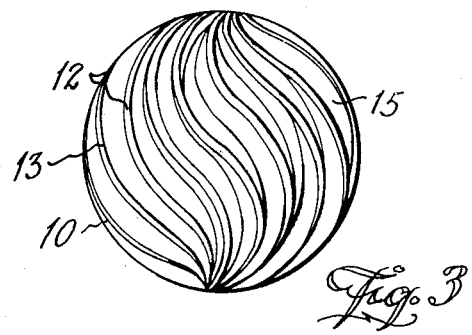
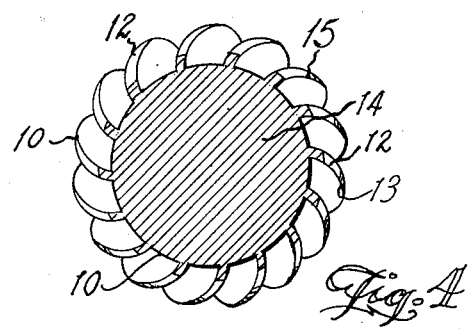
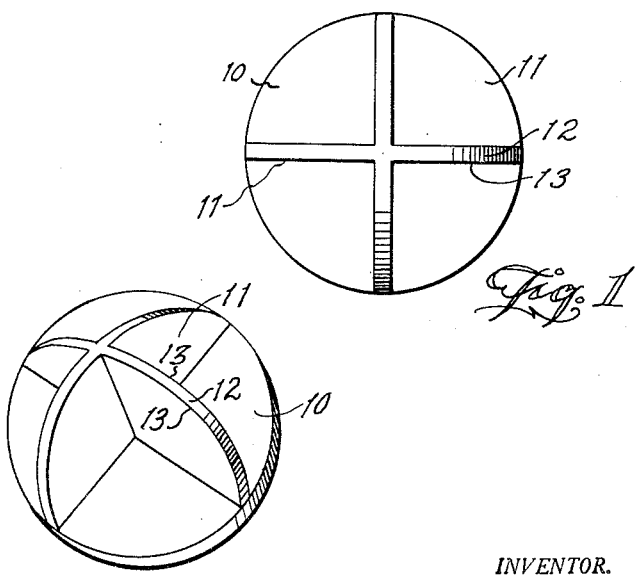
INVENTOR.
Ira T. Minyard
BY Ashley & Ashley
ATTORNEYS

Patented Jan. 23, 1951

2,539,354

UNITED STATES PATENT OFFICE 2,539,354

PARAFFIN SCRAPER

Ira T. Minyard, Odessa, Tex.

Application August 12, 1946, Serial No. 689,931

5 Claims. (Cl. 166—18)

This invention relates to new and useful improvements in paraffin scrapers.

One object of the invention is to provide an improved paraffin scraper in the form of a non-deformable sphere or ball having multitudinous cutting edges so arranged that the ball in moving longitudinally in the well tubing will revolve, whereby the paraffin or incrustation on the inner surface of the tubing will be sheared or scraped off.

Another object of the invention is to provide a spherical form of paraffin scraper having numerous spaced cutting vanes, each having a narrow surficial face providing cutters along each edge thereof, whereby the faces provide traction for the sphere in moving longitudinally through the tubing and prevent cutting or scoring thereof, as well as, stalling of the sphere, while cutting or shearing off the paraffin.

A further object of the invention is to provide an improved paraffin scraper, particularly adapted to be used with submerged well pumps having an induction tubing of relatively small diameter and including a collection chamber, adapted to be connected in the induction tubing at a point below the paraffined section and arranged to receive and store a sizeable number of the scraper spheres of the type herein set forth, each of which spheres is dropped into the tubing at periods of hours or days.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is an elevation or plan view of a paraffin scraper constructed in accordance with the invention, Fig. 2 is a perspective view of the same, Fig. 3 is an elevation of a modified form of the invention, Fig. 4 is a diametrical, cross-sectional view of the same, and Fig. 5 is a view of a portion of an induction tubing having a collection chamber therein, partly in elevation and partly in section.

In the drawings, the numeral 10, throughout the several figures, designates a sphere or spheroid body or ball which is made of suitable metal and is non-deformable. The body should have a diameter slightly less than the internal diameter of the tubing through which it is to move, thus providing sufficient clearance to allow the body free passage, but at the same time, shearing the paraffin or incrustation from the inner wall of the tubing. The body should have sufficient surficial bearing faces and cutting edges to give said body traction without cutting or scoring the inner surface of the tubing, yet at the same time to perform an efficient scraping operation. The surficial bearing faces and cutting edges may have various forms and shapes.

In Figs. 1, 2 and 5, I have shown one form of spheroid body 10; while in Figs. 3 and 4, I have illustrated another form of body. In the first form, the body is made up of members, which are, in effect, three circular disks transsecting each other at right angles to produce quadrilateral blades or vanes 11, each of which is in the form of a quadrant or sector of a circle. Each blade has an outer, narrow, curved bearing face 12, coincident with the contour of the spheroid body.

The bearing faces being substantially continuous, circumferentially of the body, provide surficial traction which causes the body to roll and revolve longitudinally through a tubing, without cutting or scoring the inner surface thereof. The curved edges 13 of the blades are sufficiently acute to form cutters or scrapers. Since the paraffin incrustation is usually semi-solid and moist, the cutting edges will shear it while moving longitudinally in a well tubing. The spheroid body will revolve, thus bringing successive cutting edges into action. The pockets between the blades will not completely fill because when they are inverted, most of the paraffin will either be washed out or will fall out.

The form shown in Figs. 3 and 4 includes a solid globular core or center 14 from which vanes or blades 15 extend, said blades having the bearing faces 12 and cutting edges 13. Assuming the spheroid body to have a north pole and a south pole, the blades extend from one pole to the other pole and are convoluted or sinuous, throughout their lengths. As the body moves longitudinally in a well tubing, said body will move or whirl and produce a very effective scraping action.

In using the scraper, the body 10 is usually dropped into the top of the well tubing through a suitable fixture and forced downwardly by a fluid under pump pressure. When the body is forced down the tubing, the paraffin will be scraped off and fall or sink in the tubing. Owing to the non-deformable nature of the body, it may be inserted in a tubing or pipe line at any point and pumped through bends and fixtures without fouling and likewise pumped out.

Submerged pumps which are located in the liquid at the lower portion of the well usually have an induction tubing, relatively small in internal diameter and thus, paraffin incrustation becomes more serious. It is desirable to keep the pump in operation and in Fig. 5 I have illustrated a device whereby this may be done. An elongate collection chamber or barrel 15 is connected in the tubing 16 between the pump and paraffin section (not shown). The ends of the tubing sections are formed with upset, externally screw-threaded pins 17 which are screwed into the ends of the barrel. This enables the barrel to be made with an internal diameter considerably greater than the internal diameter of the tubing, so that the scraper bodies 10 may be received and stored in stepped order and a sizeable number accommodated without impeding the flow of fluid.

In the lower portion of the barrel, a coiled spring 18 is supported on the lower pin 17. This spring acts to cushion the falling scrapers. The proportions must be such that the spheroid bodies will be so spaced as to permit an adequate downward flow of the pumped liquid, through the barrel. A scraper body may be pumped down the tubing, each at intervals of hours or days and the paraffin scraped without stopping the pump. At intervals of several months, the tubing may be pulled out of the well and the scraper bodies removed from the barrel.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A paraffin scraper formed of a plurality of circular disks intersecting one another substantially at right angles and having peripheral sweeping edges.

2. A paraffin scraper formed of a plurality of circular disks having a common center and intersecting one another substantially at right angles and having peripheral sweeping edges.

3. A paraffin scraper formed of a plurality of circular disks of equal diameter intersecting one another substantially at right angles and having peripheral sweeping edges.

4. A paraffin scraper including, a plurality of circular disks of equal diameter having a common center and intersecting one another substantially at right angles to define a substantially spherical scraper, each disk having peripheral scraping edges.

5. A paraffin scraper including, three circular disks of equal diameter having a common center and intersecting one another substantially at right angles to define a substantially spherical scraper, each disk having peripheral scraping edges.

IRA T. MINYARD.

REFERENCES CITED

The following references are of record in the file of this patent:

UNITED STATES PATENTS

| Number | Name | Date |
| --- | --- | --- |
| 646,545 | Novotny | Apr. 3, 1900 |
| 1,475,431 | Evans | Nov. 27, 1923 |
| 2,058,825 | Rallet et al. | Oct. 27, 1936 |
| 2,172,636 | Coberly | Sept. 12, 1939 |
| 2,184,393 | Luccous | Dec. 26, 1939 |
| 2,478,961 | Wortham | Aug. 16, 1949 |